(12) United States Patent
Ozaki et al.

(10) Patent No.: US 6,243,646 B1
(45) Date of Patent: Jun. 5, 2001

(54) VEHICLE NAVIGATION SYSTEM WITH PIXEL TRANSMISSION TO DISPLAY

(75) Inventors: Naokazu Ozaki; Toyoji Hiyokawa; Junzo Matsuba; Kyomi Morimoto, all of Anjo (JP)

(73) Assignee: Aisin AW Co., Ltd. (JP)

(*) Notice: Subject to any disclaimer, the term of this patent is extended or adjusted under 35 U.S.C. 154(b) by 0 days.

(21) Appl. No.: 09/301,044

(22) Filed: Apr. 28, 1999

(30) Foreign Application Priority Data

Apr. 28, 1998 (JP) .................................................. 10-119268

(51) Int. Cl.[7] ................................................ G01C 21/34
(52) U.S. Cl. ........................... 701/211; 701/201; 701/209
(58) Field of Search ..................................... 701/211, 209, 701/201; 340/995; 345/509

(56) References Cited

U.S. PATENT DOCUMENTS

| | | | | |
|---|---|---|---|---|
| 5,323,321 | * | 6/1994 | Smith, Jr. ............................ | 701/211 |
| 5,402,120 | * | 3/1995 | Fujii et al. ........................... | 701/209 |
| 5,509,115 | * | 4/1996 | Butterfield et al. ................. | 345/418 |
| 5,654,892 | * | 8/1997 | Fujii et al. ........................... | 701/211 |
| 5,910,805 | * | 6/1999 | Hickey et al. ....................... | 345/467 |
| 5,982,368 | * | 11/1999 | Toffolo et al. ...................... | 345/348 |

* cited by examiner

*Primary Examiner*—Michael J. Zanelli
(74) *Attorney, Agent, or Firm*—Lorusso & Loud

(57) ABSTRACT

A vehicle navigation system is made to generate bitmap image data necessary for navigation, including map data, road data, font data, etc., and then to transmit a pattern (font) image and an enlarged intersection image to a display.

9 Claims, 11 Drawing Sheets

FIG.8A (MAIN UNIT SIDE)

FIG.8B (DISPLAY SIDE)

TRANSMISSION

FIG.13A
GUIDE ROAD DATA

| NUMBER OF ROAD (n) | | |
|---|---|---|
| 1 | ROAD NUMBER | |
| | LENGTH | |
| | ROAD ATTRIBUTE DATA | |
| | SHAPE DATA ADDRESS, SIZE | |
| | GUIDANCE DATA ADDRESS, SIZE | |
| | · | |
| | · | |
| | · | |
| | · | |
| n | ROAD NUMBER | |
| | · | |
| | · | |
| | GUIDANCE DATA ADDRESS, SIZE | |

FIG.13B
SHAPE DATA

| NUMBER OF NODE (m) | | |
|---|---|---|
| 1 | EAST LONGITUDE | |
| | NORTH LATITUDE | |
| | · | |
| | · | |
| | · | |
| m | EAST LONGITUDE | |
| | NORTH LATITUDE | |

FIG.13C
GUIDANCE DATA

| INTERSECTION NAME |
|---|
| ROAD NAME DATA |
| CAUTION DATA |
| ROAD NAME AUDIO DATA ADDRESS, SIZE |
| COURSE DATA ADDRESS, SIZE |

FIG.13D
COURSE DATA

| NUMBER OF COURSE (k) | | |
|---|---|---|
| 1 | COURSE ROAD NUMBER | |
| | COURSE NAME | |
| | COURSE NAME AUDIO DATA ADDRESS, SIZE | |
| | COURSE DIRECTION DATA | |
| | TRAVEL GUIDANCE DATA | |
| | · | |
| | · | |
| | · | |
| k | COURSE ROAD NUMBER | |
| | · | |
| | · | |
| | TRAVEL GUIDANCE DATA | |

FIG.13E
COURSE DIRECTION DATA

−1 : INVALID
 0 : UNNECESSARY
 1 : STRAIGHT
 2 : RIGHT
 3 : SLIGHT RIGHT
 4 : SHARP RIGHT
 5 : LEFT
 6 : SLIGHT LEFT
 7 : SHARP LEFT

VEHICLE NAVIGATION SYSTEM WITH PIXEL TRANSMISSION TO DISPLAY

BACKGROUND OF THE INVENTION

1. Field of the Invention

This invention relates to a vehicle navigation system which displays a pattern (font) screen, an enlarged intersection screen, etc., without using an image signal line such as RGB, NTSC etc.

2. Description of the Prior Art

Prior art navigation systems, in general, have an image memory (VRAM) provided in a main unit side for providing guidance and displays of a map of the vicinity of the vehicle position or the destination by sending guide map data and road map data to a display in RGB or NTSC format.

FIG. 15 shows an example of such a navigation system including a main unit 50 for generating data necessary for the navigation system and a display 60 for displaying a guidance image. Upon start-up, the main unit 50 reads a program stored in a ROM 51 into a RAM 52 and reads out map data and road data, etc., stored in a CD-ROM in a CD-ROM driver 53. Present position is detected by a GPS receiver 54 or a gyro sensor 55 and a route to a destination is searched by a CPU 56. The CPU 56 reads a vehicle signal and sequentially generates image data for route guidance. The generated image data is read sequentially into a special purpose image memory (VRAM) 58, from which it is read out by a image controller 57, then converted in an encoder into an image signal 59, and finally sent as an image signal in a format such as RGB, NTSC, PAL, SECAM, VGA, etc. This image signal is decoded in a decoder 62 and is displayed on a display 60 as the guidance image through a driving circuit 61.

Navigation systems using a LCD display, with characters and fonts on the display side, without VRAM on the main unit side, transmitting image pattern numbers, etc., from the main unit side, which display a traveling direction arrow, etc., are also known. FIG. 16A exemplifies such a navigation system in which font (pattern) data is stored in advance in a memory 53 on the display side. The font data consists of plural data patterns for arrows, etc. assigned numbers as shown in FIG. 16B. Referring to FIG. 16A, in performing route guidance, a main unit 50 of the navigation system transfers a predetermined font pattern such as No. 1, No. 2, etc., over to the display side which then reads out data received in the received font patterns, and the data read out is displayed on a display 51 by the driving circuit 52.

A vehicle navigation system transmits image data as shown in in NTSC format, etc. and displays guidance. Accordingly, enormous amounts of image data must be transmitted. Therefore, a special purpose system such as an image controller, an image memory, etc., are required, with the result that the system price has become higher. Further, not only the main unit of the navigation system but also the display side requires a decoding circuit for image signals, which also results in increasing the system price.

Further, if drawing is performed by using pattern (font) data for a display, representation of the display is limited to a number of patterns (fonts), which must therefore represent only simple display, and, accordingly, actual road shape, a detailed enlarged intersection image, etc., can not be displayed. It is also difficult to store the shape of all intersections in font and any increase in the shape patterns to be displayed requires memory space on the display side to be extended, which also results in increasing the system price. Furthermore, the display unit must be a special purpose display in order to receive the font data, which also results in increasing the system price. Further, to increase the patterns (fonts), the main unit must be replaced along with the display with which it is paired, again resulting in an increase in the system price.

SUMMARY OF THE INVENTION

Accordingly, an object of this invention is to provide a capability for displaying a pattern (font) image and an enlarged intersection image without using an image signal such as RGB, NTSC or the like.

The navigation system of the present invention, includes memory means for storing data necessary for route guidance such as map data, road data, font data, etc.; input means for inputting information necessary for searching a route to a destination; and information control means for generating and sending image data for route guidance on the basis of information inputted by said input means and data stored in the memory means.

These and other objects, features and advantages of the invention will become apparent from the following description of preferred embodiments of the invention, as illustrated in the accompanying drawings.

BRIEF DESCRIPTION OF THE DRAWINGS

In the drawings:

FIGS. 8A and 8B are diagrams illustrating an example of ransmission of a changed part of binary data;

FIG. 13 is a diagram of guide road data suitable for use in the navigation system of the present invention;

DETAILED DESCRIPTION OF THE PREFERRED EMBODIMENTS

Preferred embodiments of the present invention are described below with reference to the drawings.

Figures 1, 2:
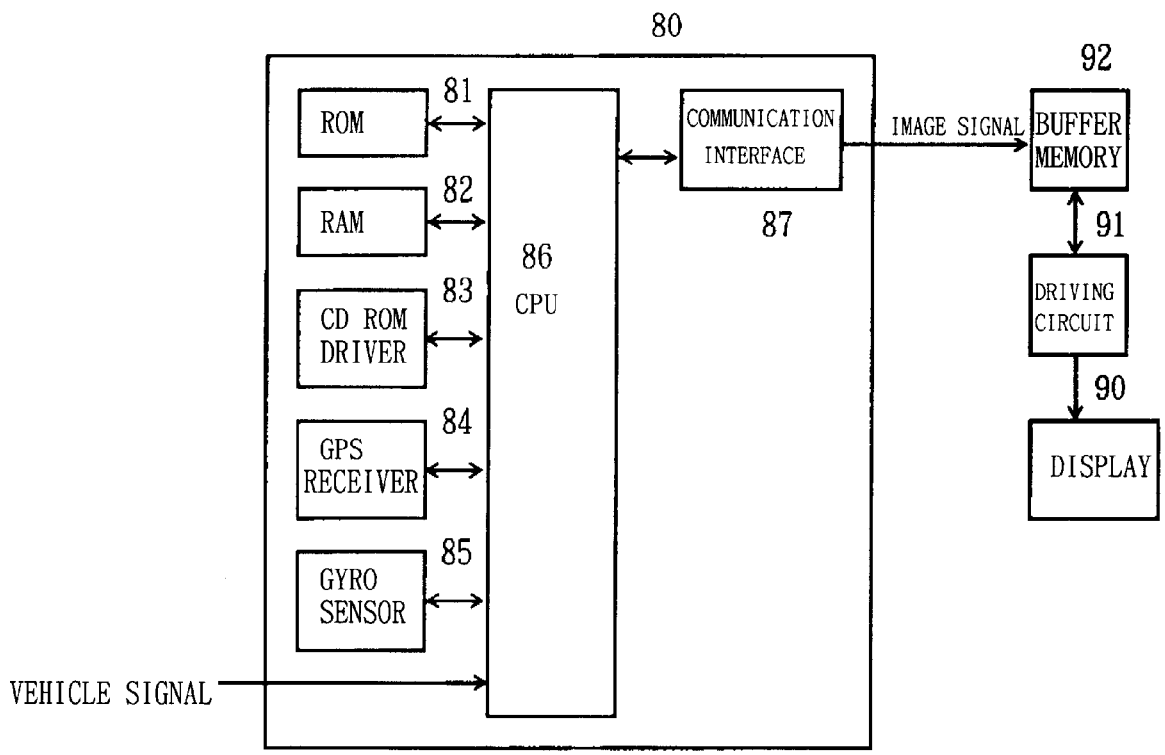
FIG. 1 is a block diagram of the basic components of the vehicle navigation system according to the present invention.
FIG. 2 is a diagram showing an example of bitmap image data.

The block diagram of FIG. 1 shows the basic vehicle navigation system of the present invention as including a main unit 80 which includes a ROM 81 in which a program necessary for navigation is stored; a RAM 82 which is a working memory for performing necessary calculations; a driver 83 for a memory medium such as an Optical-Disc, a Hard-Disc, etc., in which all data necessary for navigation such as map data and road data are stored; a GPS receiver 84 including D-GPS, etc., for detecting present position of the vehicle by receiving a signal from an artificial satellite; a gyro sensor 85 including an acceleration sensor, for detecting the present position; a central processing unit 86 for executing audio/visual guidance processing necessary for route searching and route guidance and control of the overall system; and an interface 87 which consists of a communication IC used for transmitting guidance data (binary data) to a display side by using a serial communication line, a parallel communication line, etc. The system further includes a display 90 for displaying route guidance information based on binary data transmitted by the serial communication line, the parallel communication line, etc., from the navigation system main unit 80. The binary data is temporarily stored in a buffer memory 92, and then a display driving signal is generated in a driving circuit 91, based on this data, and transmitted to the display 90.

The navigation system according to the present invention generates guidance image data in the form of a bitmap in a CPU 86 and transmits the generated data to a display system. Specifically, the CPU 86 reads map data, road data, etc., through a CDROM driver 83 and generates pixel or bitmap data as shown in FIG. 2. This bitmap data consists of binary data of [0] and [1], which in FIG. 2 is image data for an arrow pointing up. This bitmap data is to be transmitted by serial communication or parallel communication through an interface 87 such as a communication IC. The transmitted data is temporary stored in a buffer memory 82, and a bitmap image is generated in accordance with display driving signals corresponding to [0] and [1] for addition to a display. The present invention is applicable to both a monochrome image and a color image.

Figure 3:
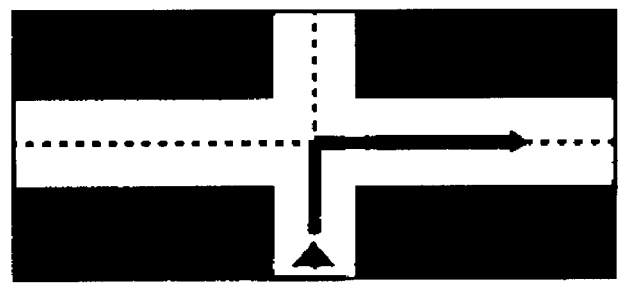
FIG. 3 is an enlarged intersection image formed from bitmap data.
Figure 15:
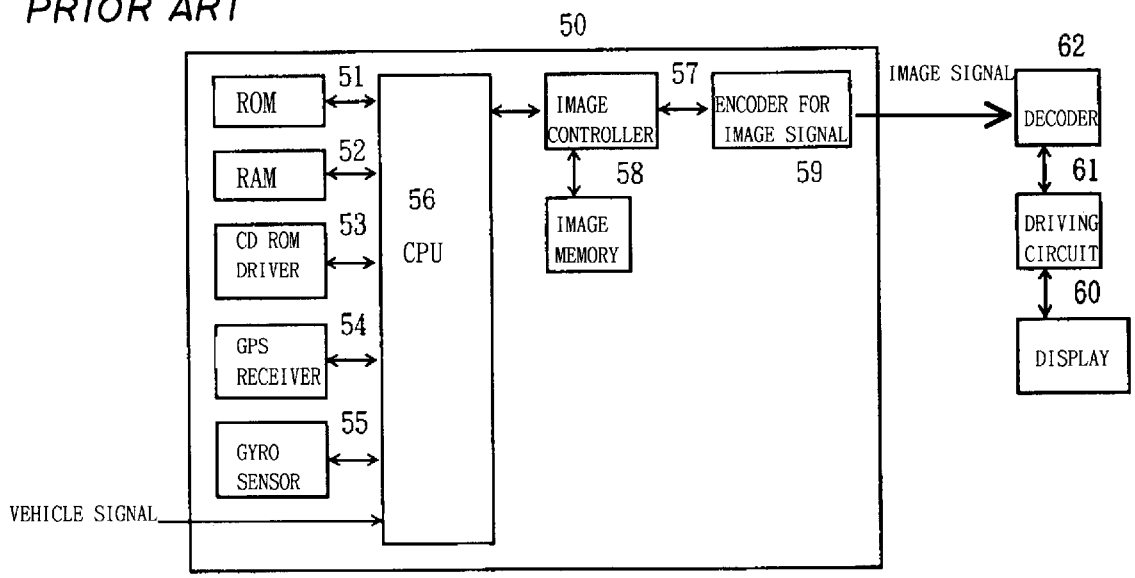
FIG. 15 is a block diagram of a prior art navigation system.
Figure 16A:
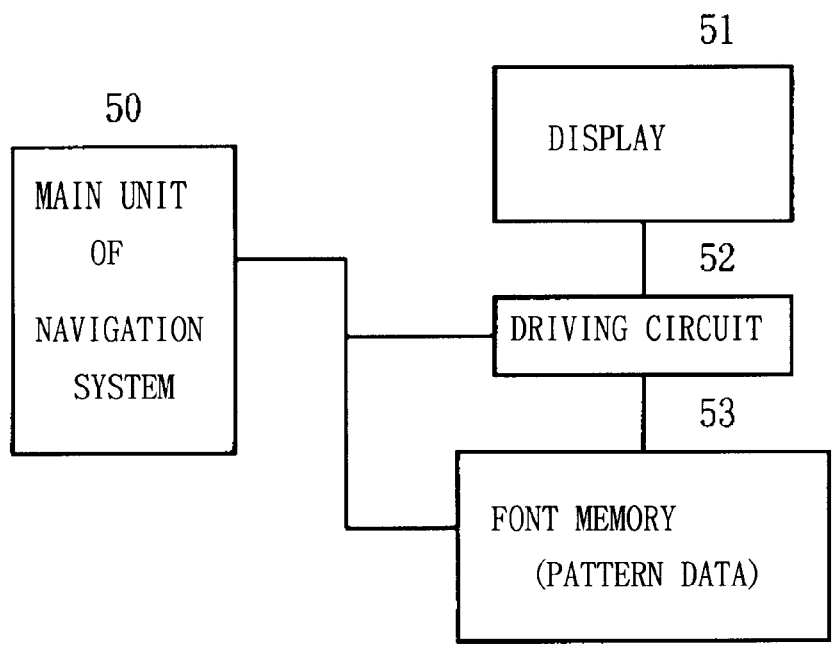
FIG. 16A is a block diagram of another prior art navigation system and FIG. 16B is an illustration of a series of images usable in the prior art system of FIG. 16A.
Figure 16B:
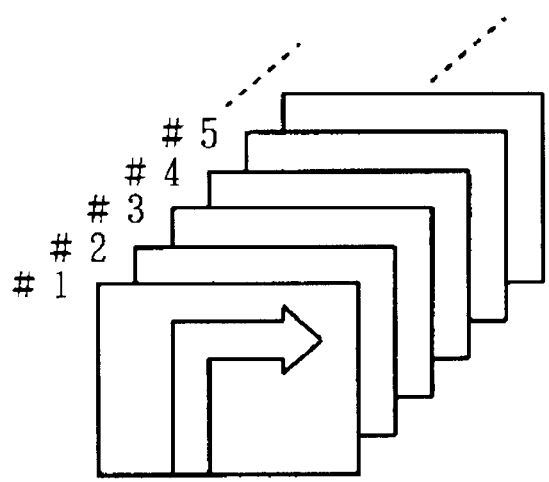

Thus, by generating the image data with the CPU 86 and enabling the generated image data to be transmitted by serial communication or the parallel communication, therefore a detailed enlarged intersection image as shown in FIG. 3 can be displayed without using an image signal line such as a RGB, NTSC, etc. Further, since a display is driven by reading data from the buffer memory 82, it is not necessary to continue transmitting data as when using a special purpose image memory such as shown in FIG. 15. Accordingly, a special purpose image controller and image memory are not required, the processing load on the main unit side of the navigation system is reduced, and the performance capability of the CPU for other purposes is improved.

Figure 4:
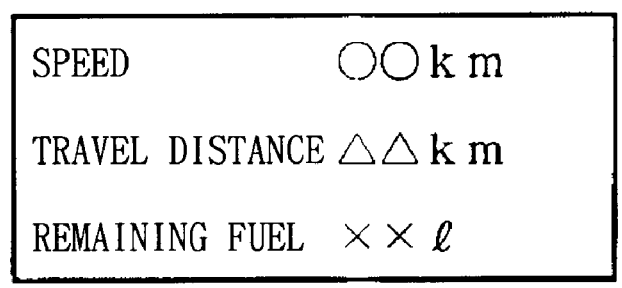
FIG. 4 is a diagram showing an example of a bitmap display image.

A navigation system according to the present invention can be designed to share a communication cable with other systems since an image is not continuously transmitted to the display system. For example, it can be constructed so that an instruction input by input means in the display system is communicated to the navigation system by using a communication cable for image transmission. Further, when data for speed, driving distance, quantity of fuel remaining, etc., is transmitted as a vehicle signal as shown in FIG. 4, sharing this communication line enables a control panel and an interface pre-arranged in a vehicle to be used in common. Further, a communication terminal and another communication cable such as VICS or ATIS can be used in common. Thus, at least one communication cable of the navigation system is sufficient to be used in common, thus reducing the cost for communication cables as well as the space required for the communication cables. As a result, the present invention minimizes installation space. Further, it simplifies wiring which makes its connection easier.

Figure 5:
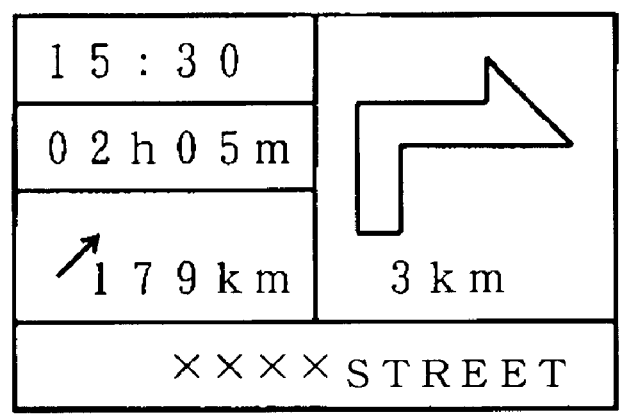
FIG. 5 is a diagram showing another example of a bitmap display image.

Further, a time, remaining time to a destination, remaining distance, a direction, street name of a present position, and bitmap data for drawing which an arrow of an intersection in which the vehicle should turn next, as shown in FIG. 5, are all transmitted to the display side. Therefore, it is no longer necessary to have special purpose guidance image data such as a font, a character, etc., as in the prior art, a versatility display can be used and a pre-installed panel can be shared for displaying a navigation image.

However, in actual implementation of this invention for display of a time, a time elapsed, a direction, and a remaining distance are usually concurrently displayed when an intersection in which an vehicle should turn is detected to be within a predetermined distance, and then the main unit of the navigation system produces bitmap data for an enlarged intersection image and transmits that data to the display.

Figure 6A:
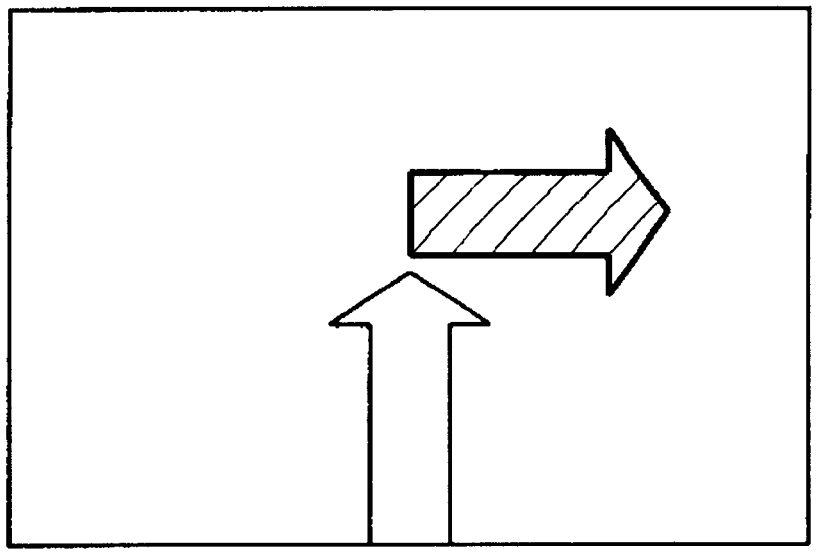
FIGS. 6A and 6B are diagrams showing further examples of bitmap display images.
Figure 6B:
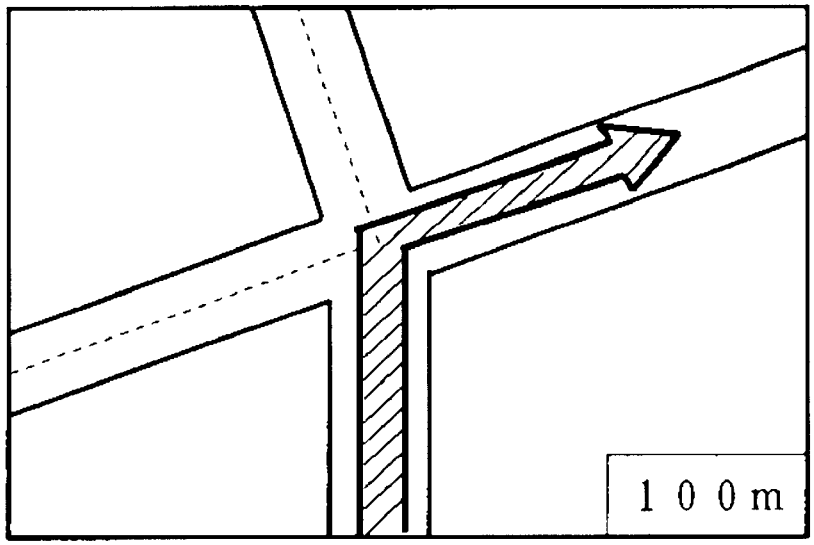

FIGS. 6A and 6B show an example of a bitmap data display, in which FIG. 6A shows a simple graphic, i.e. an arrow, and FIG. 6B shows a complex graphic, i.e. an enlarged intersection image. Since the present invention generates image data in the CPU and transmits the generated data to the display system in the form of digital bitmap data, the display system is only required to display the transmitted data in sequence and is not required to either identify the data transmitted to the display side or to process it. Therefore, the navigation system can display guidance information by using a general purpose display rather than a special purpose display system. Further, since the display is a singly used unit simply connected to the main unit of the navigation system by a communication line, it is possible to upgrade it by replacing the main unit of the navigation system as well as to develop various systems easily, which results in a cost reduction for the navigation system.

An image screen is not generated on the basis of font data stored in the display side so that the navigation system can easily perform changes to the screen layout and font. Therefore, upgrading both the navigation system and display is not necessary, and a change of specification can be easily made, thus further reducing the cost of the navigation system.

Figure 7:
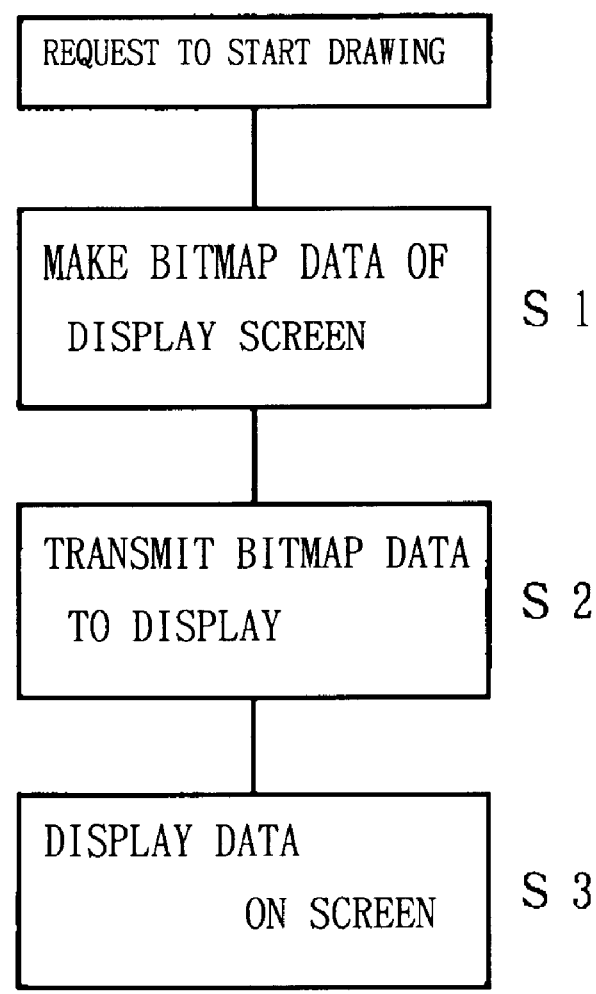
FIG. 7 is a flow chart of an image drawing routine.

FIG. 7 is a flow chart of a drawing process for forming a display with bitmap data. A main unit of the navigation system generates bitmap data such as the example shown in FIG. 2 (step S1), then transmits this bitmap data to the display side through a communication line (step S2) when a request is made to start drawing. This request may be by the user, by arrival at a point a predetermined distance or a predetermined time in advance of some landmark or destination, by passage through an intersection, by passage of a predetermined time, by completion of a predetermined travel distance, by a route change, and/or by a screen change. On the display side, the transmitted data is displayed on the screen just as it is received without making any changes (step S3).

As previously described, the navigation system of the present invention, in which guidance data generated in a CPU 86 is bitmap image data, is not provided with a special purpose image system such as shown in FIG. 15. The CPU 86 reads map data, road data, etc., through a CD-ROM driver 83, and generates bitmap data as shown in FIG. 2; however, in a RAM area, the navigation system only draws that part of the image which requires changes (generating bitmap data).

To explain this partial drawing, an example is shown in FIGS. 8A and 8B, in which an area A is the only part which requires redrawing, i.e. only area A is to be redrawn (FIG. 8A) and then transmitted by serial communication or parallel communication in a interface 87 such as a communication IC, etc. The transmitted data is written into the part corresponding to the area A of the bitmap (FIG. 8B) accumulated in a buffer memory 92. Area "A" is rewritten, for example, as shown in FIGS. 8A and 8B.

Thus, the main unit side transmits data drawing only that part which requires a change, corresponding to the contents stored in the buffer memory 92, so that the data volume is drastically decreased and the speed of the drawing process and the speed of the data transfer are increased, even if utilizing an inexpensive navigation system not having a special purpose drawing capability.

Partial redrawing of a screen of display divided into predetermined areas showing, respectively, a time, a required time, a distance, a direction, a travel direction and a street name as shown in FIG. 5 are divided respectively so as to be displayed.

The time and required time displayed on the guidance screen are changed on a minute basis and the distance is changed on a one kilometer basis. If the vehicle is currently traveling at 120 km per hour, a display of the distance should be changed every 30 seconds.

Figure 9:
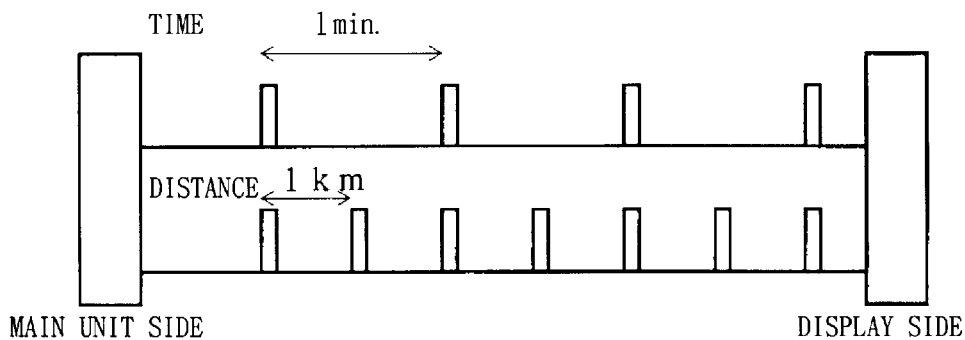
FIG. 9 is a diagram illustrating data transmission from the main unit side to the display side.
Figure 10A:
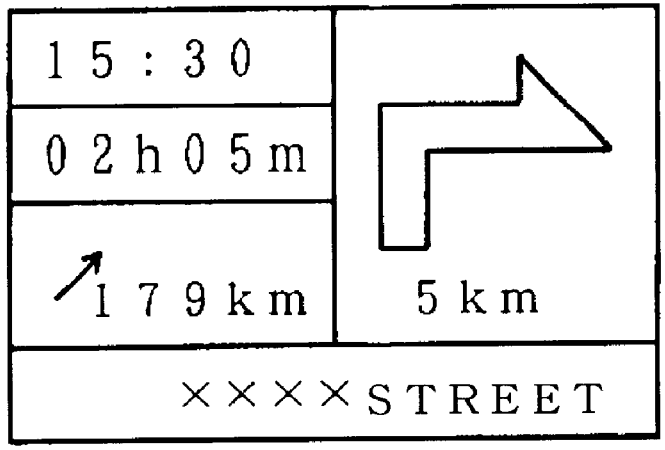
FIGS. 10A, 10B and 10C illustrate a series of displays of data successively changed in part.
Figure 10B:
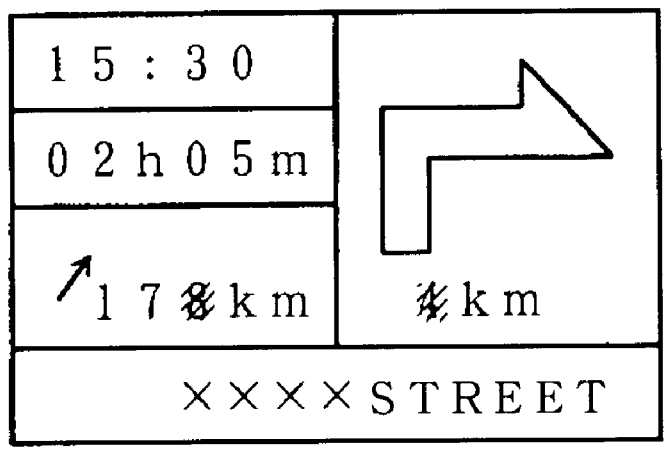
Figure 10C:
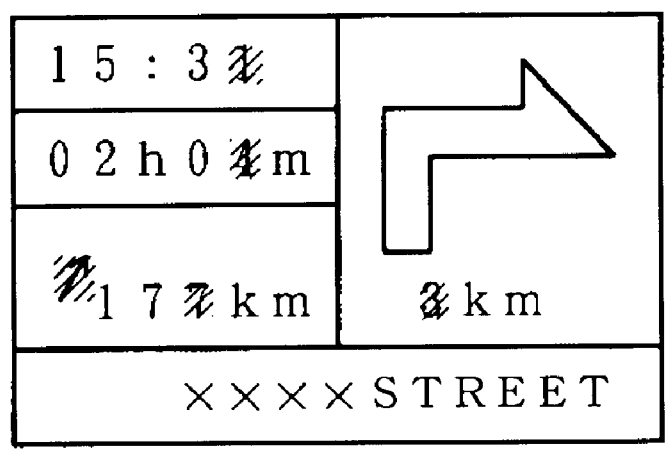

Hence, as shown in FIG. 9, time data is transmitted on a one minute basis and distance data is transmitted on a 30 seconds basis. When 30 seconds has passed on a display screen as shown in FIG. 10A, currently displaying a time, a required time, a distance, a direction, a traveling direction and a street name, only the shaded areas shown in FIG. 10B of bitmap data are rewritten (seen as 9→8 and 5→4) in a RAM area of the main unit side. Further, when one minute has passed on the display screen, only the shaded area shown in FIG. 10C has its bitmap data rewritten (8→7, 4→3), and an arrow indicating a direction to a destination is also rewritten. Then the rewritten bitmap data is transmitted to the display side and an area corresponding to a buffer memory is rewritten and displayed. Of course, regarding the display of distance, not only certain digits of the distance number are changed but also all digits of the number may be rewritten, with the same result.

Information control means (CPU) draws a display screen consisting of a plurality of items of information into a memory and transmits the drawn screen to a display whenever required. Further, the information control means judges whether or not a previously drawn image has a part in which information is to be changed and, if to be changed, performs a drawing process for the changed information part and stores the newly drawn image in the memory. When it is detected that information is changed regarding an image being displayed, only the changed portion of information is transmitted to be rewritten, whereby the time required for drawing can be reduced. This also reduces the amount of processing used for drawing which enables the information control means to execute other processing. And, since it is no longer necessary to intensively transmit a high-volume of data, the transfer rate can be reduced. Therefore, a communication line with a lower transfer rate can be used, which enables a cost reduction. Furthermore, the time of use for a communication line is also reduced as the transfer rate is increased so that other information can be transmitted as well as received during the time when an image transfer is not being executed.

The information control means processes a plurality of display image types for displaying on the display system and stores them in the memory in order to be able to quickly correspond to a request for display.

Figure 11:
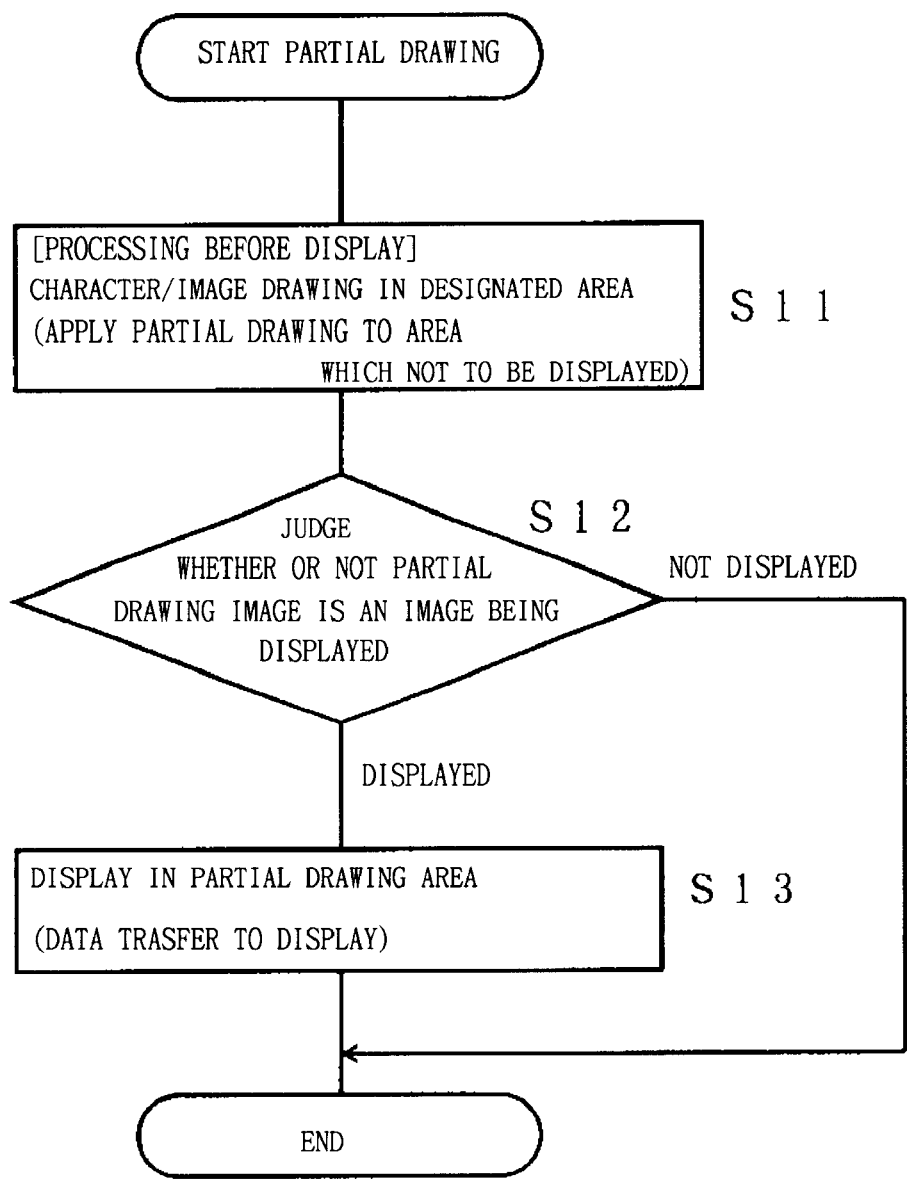
FIG. 11 is a flow chart of a routine for partial change of a display.

In the routine illustrated by the flow chart of FIG. 11, the information control means draws the changed part in memory (step S11). Next, a judgment is made whether the drawn data in which the partial drawing process is executed, is currently displayed on a screen (step S12). For example, if three types of display screens as shown in FIG. 3, FIG. 4 and FIG. 5 are drawn in the memory, the partial drawing processes are all executed for display related to distances of each display type. However, when the screen being displayed in the display system is an intersection image as shown in FIG. 3, the information control means partly transmits to the display system, only a screen displaying a distance related to the intersection image. The information control means transmits the partly drawn screen for the display screen type judged to be displayed on the display screen (step S13). On the other hand, the processing is completed, without transmitting data to the display system, by executing a drawing process only in the memory.

Figure 12:
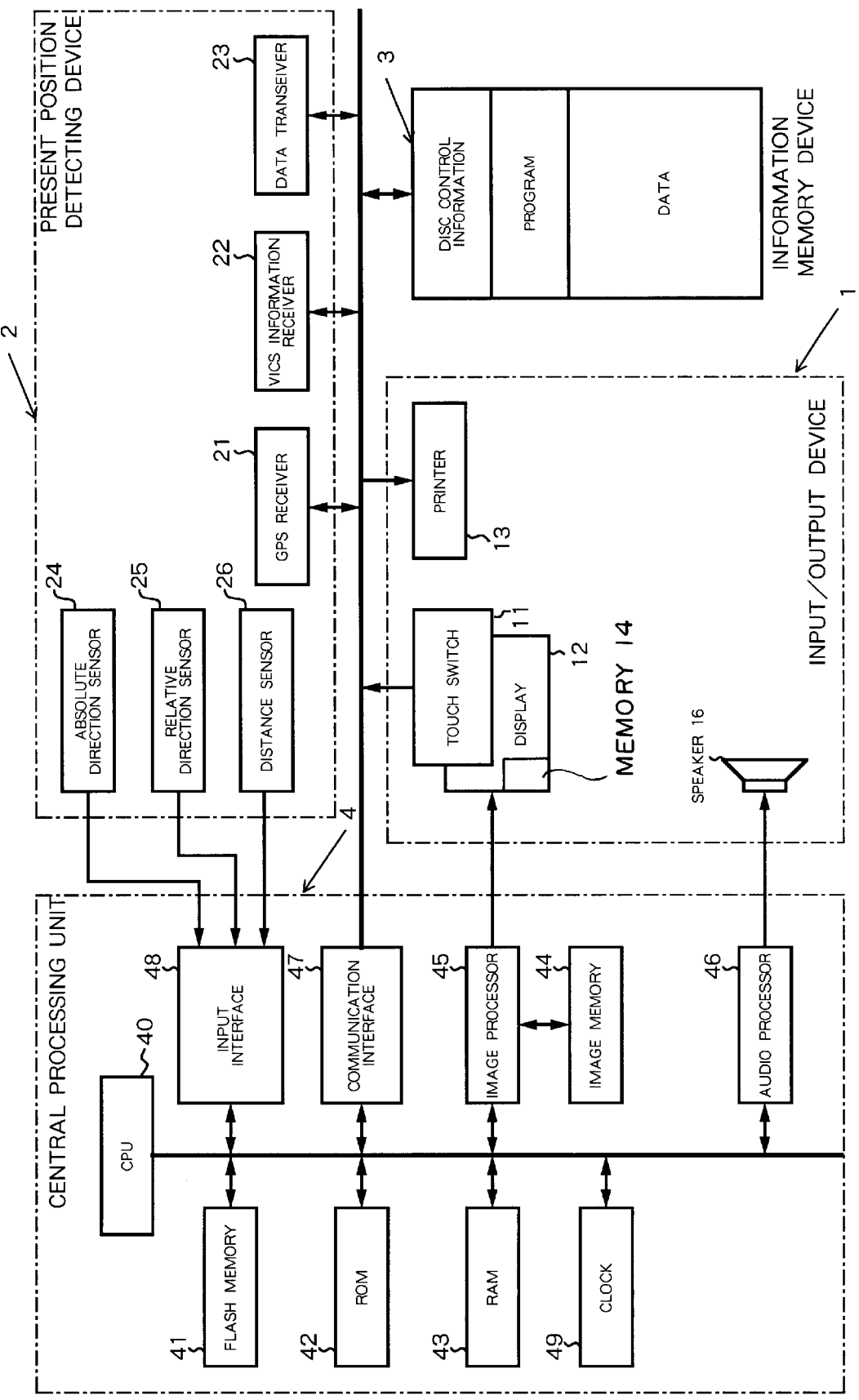
FIG. 12 is a block diagram of one embodiment of the navigation system according to the present invention.

The block diagram of FIG. 12 shows a preferred embodiment of a vehicle navigation system according to the present invention as including: an input/output unit 1 for inputting/outputting information relating to route guidance; a present position detecting device 2 for detecting information for the present position of the vehicle; an information memory device 3 in which navigation data necessary for calculating a route and display/voice guidance data necessary for the route guidance and programs (application and/or OS), etc., are stored; and a central processing unit 4 for controlling the entire system with executing display/voice guidance processing necessary for route search processing and route guidance.

The input/output unit 1 is equipped with function switches for input of a destination and for instructing the central processing unit 4 to execute the navigation processing at the will of the driver, so as to be capable of outputting guidance data with voice and/or screen display, as required by the driver, and to print out the processed data, etc. As the means for implementing these functions, the input section of the input/output unit has a touch switch 11 for entering a destination in the form of telephone number or coordinates on a map, etc., and for requesting route guidance. It is also possible to use an input device such as a touch switch, a remote controller, etc. Further the output section comprises a display 12 for displaying input data on a screen and route guidance screen, a printer 13 for printing out data processed by the central processing unit 4 and data stored in the information memory device 3, and a speaker 16 for outputting route guidance by voice.

It is possible to add a voice recognition unit for enabling voice input or a record card reader for reading data recorded on an IC or a magnetic card. It is also possible to add a data communication device for exchanging data between information sources such as an information center, where data necessary for navigation is gathered and stored, and for providing information through an communication line responsive to a driver's request, and to add a portable type electric unit, etc., having map data, destination data and data for both a simplified map and a shape map with building shapes.

The display 12 may be a simple liquid-crystal display device, etc., which displays an enlarged intersection image, a destination name, a time, a distance, and a travel direction arrow, etc. on the basis of map data and guidance data processed by the central processing unit 4. Since image data to be transmitted to the display 12 is binary data (bitmap data), which is not transmitted by a special-purpose image signal line but by a communication line used for serial communication, etc., other communication lines can be used in common for this transmission. However, the display 12 is equipped with a memory 14 to temporally store bitmap data.

The display 12 is provided inside the instrumental panel in the vicinity of the driver's seat, and the driver can ascertain the present location of the vehicle by observing the interval screen and obtain information on the route to be followed. Further, the display may be constructed so that a point input, a road input, etc., are executed by touching a display screen in the form of a touch panel, a touch screen, etc., or by tracing the screen.

The present position detection device 2 includes a GPS receiver 21 for obtaining information by using a global positioning system to detect a present position of a vehicle (GPS); VICS information receiver 22 for obtaining information by using FM multiple signal broadcasting, radio beacons, optical beacons, etc.; a data transceiver 23 for communicating bidirectionally with an information center (for example, ATIS) or with other vehicles by using a cellular telephone, a personal computer, etc.; an absolute direction sensor 24 for detecting a travel direction of a vehicle, as an absolute direction, for example by using a geomagnetic device; a relative direction sensor 25 for detecting travel direction of the vehicle as a relative direction, e.g. a steering sensor and/or a gyro sensor; and a distance sensor 26 for detecting distance of travel by the vehicle, for example by the number of revolutions of a wheel, which is capable of transmitting/receiving information regarding the vehicle, for example road information and traffic information, detecting information regarding a present position of the vehicle and further transmitting/receiving information regarding the present position of the vehicle.

The information memory device 3 is an external storage device in which navigation programs and data are stored and which may be, for example, a CD-ROM. Programs including a program for route searching, a program as shown in the flow chart of FIG. 11, a program for display output control necessary for route guidance and an audio output display necessary for voice guidance as well, as well as data necessary for execution of such programs, are stored in the CD-ROM. Further, the stored data may be in the form of files of map data, route data, guidance data, map matching data, destination data, registered point data, road data, genre data, landmark data, etc., wherein all data necessary for the navigation system are stored. The present invention can be applied to a type of navigation system in which all such data is stored exclusively in a CD-ROM whereas the programs are stored in the CPU.

The central processing unit 4 includes: a CPU 40 for performing various calculations; a flash memory 41 for reading a program from a CD-ROM of a information memory device 3; a ROM 42 wherein a program for a program check of the flash memory 41 as well as update processing (program reading means) are stored; a RAM 43 for temporally storing searched route guidance information such as point coordinates of a predetermined destination, a road name, a code number, etc. as well as data used during calculation; an audio processor 46 by which an analog signal obtained by combining audio, phrases, single sentences and sounds, etc. which are read out from the information memory device 3 on the basis of a display-output control signal, is output to a speaker 16; a communication interface 47 for performing an exchange of input/output data by communications; a sensor-input interface 48 for accepting a sensor signal received from the present position detecting means 2; and a clock 49 for entering date and time into internal dialog information. Here, the system is constructed so that route guidance may be by both screen display and audio output and audio output can be selected by a driver.

Alternatively, the program which executes update processing may be stored in the external memory device.

Programs according to the present invention and programs to execute other navigation systems may all be stored in a CD-ROM such as an external memory medium, and also a part or all of programs may also be stored in a ROM 42 on the main unit side.

Various navigation functions are implemented by calculation using data and programs stored in this external memory medium, which are input in the central processing unit of the main unit of the navigation system as an external signal.

A navigation system according to the present invention, may include a self-installed flash memory 41 with a relatively large capacity for reading a program from a CD-ROM of the external memory device as described above, and a self-installed ROM 42 having a small capacity in which a program to execute start-up of a CD (program reading means) are stored. The flash memory 41 is a nonvolatile memory means in which information is maintained even if switched off. The navigation system starts a program stored in ROM 42, which is a program reading means, as start-up processing of CD so as to perform a program check of a program stored in the flash memory 41, and reads disc control information, etc., of a CD-ROM of the information memory device 3. A loading process (up-date processing) is performed by judging condition of this information and the flash memory 41.

FIGS. 13A–13E are block diagrams showing an example of a construction of main data files stored in the information memory device 3 according to the present invention. FIG. 13A shows a guidance data file containing data necessary to perform route guidance for the route calculated by route calculated means, and the data file is composed of data such as road number, length, road attribute data, address and size regarding shape data, and address and size regarding guidance data for (n) number of roads. The road number is for one direction (outbound or inbound) for each road segment between crossroads. The road attribute data is road guidance supplemental information data, which indicates whether the road is an overpass, a road along side an overpass, an underpass or a road alongside an underpass, and information on the number of the lanes. The shape data, as shown in FIG. 13B, has coordinate data consisting of east longitude and north latitude which corresponds to each of (m) nodes, with each road being divided into a plurality of nodes. The guidance data as shown in FIG. 13C is composed of intersection (or crossroads) name data, caution data, road name data, address and size regarding road name audio data, and address and course data. The caution data serves to direct increased attention to a driver for a railroad crossing, a tunnel, etc., and the data indicates information regarding existence of a railroad crossing, an entrance of a tunnel, an exit of a tunnel, a road width reduction point or no caution. The road name data indicates information regarding road type such as a highway, an expressway, a tollway, a general road (a national road, a prefectural road, or other) as well as information regarding a highway, an expressway and a tollway to indicate whether the respective road is a main traffic road or a road connecting between a main traffic road and a general road, and data is composed of road data and classification number such as individual number data per each road type.

The course data as shown in FIG. 13D is composed of a course road number, a course name, an address and size of course name audio data, course direction data and travel guidance data. The course name includes an area name to be followed. Further, course direction data indicates information such as invalid (the course direction is not to be used), unnecessary (guidance is not given), straight, right direction, slight right direction, shape right direction, left direction, slight left direction, and shape left direction. The travel guidance data includes data for which lanes a vehicle should travel in the case of a plurality of lanes, and which further indicates information such as right, left, center, or not center.

Figure 14:
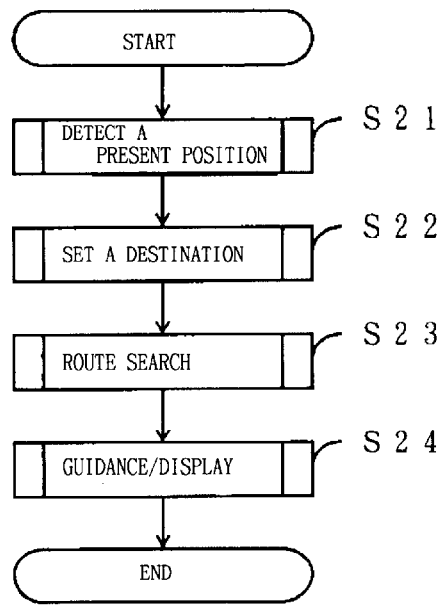
FIG. 14 is a flow chart of a main routine for operation of the entire navigation system according to the present invention.

Next, navigation processing according to the present invention is explained with reference to FIG. 14 which is a flow chart of a routine for operating the entire system of a navigation system according to the present invention. When a program for route guidance is started by a program which is read from the information memory device 3 into the CPU 40 of the central processing unit, the name of the present position, etc. are displayed by the present position detection device 2, a map of the vicinity with centering the present position is displayed, and the name of the present position is also displayed (step 521). Then, a destination is set by using an object name such as an area name, a facility name, etc., a telephone number, an address, a registered location, a road name, etc. (step S22), and route search from the present position to the destination is performed (step 523). When a route is determined, the navigation system repeatedly performs route search/display until the vehicle reaches the destination while tracking the present position using the present position detecting device (step 524). When a stop on the way before reaching the destination is entered, a search area is determined and research is performed within the determined search area, in the same manner as explained previously, the navigation system repeatedly performs route searching until the vehicle reaches the destination.

As is clear from the above explanation, the system according to the present invention enables a pattern image and an enlarged intersection image to be displayed without transmitting image data constantly as required in the prior art. Further, the system improves performance and a communication cable can be shared with other systems.

The entire disclosure of Japanese Patent Application No, 10-119268 filed on Apr. 28, 1998, including specification, claims, drawings and summary, is incorporated herein by reference in its entirely.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A vehicle navigation system comprising:
   storage means for storing data for route guidance, inclusive of map data, road data, and font data;
   input means for inputting a destination and information necessary for searching a route;
   information control means for generating pixel data of an intersection and an arrow indicating a direction for the vehicle to turn in the intersection on the basis of the inputted information and data stored in said storage means and for transmitting the pixel data; and
   display means for receiving the pixel data transmitted from the information control means and for displaying an image including the intersection and the arrow based on the received pixel data.

2. A vehicle navigation system according to claim 1, wherein the pixel data is binary data.

3. A vehicle navigation system according to claim 1, wherein said information control means transmits only pixel data for a portion of the displayed image, less than the whole displayed image, to be changed.

4. A vehicle navigation system according to claim 1, further comprising a transmission line for transmitting the pixel data from said information control means to said display means.

5. The vehicle navigation system according to claim 4 wherein the transmission line is a serial transmission line for transmitting binary serial data or a parallel transmission line for transmitting binary parallel data.

6. A vehicle navigation system comprising:
   a navigation processing unit including a storage media containing data including map data, road data, and font data for route guidance; input means for inputting a destination and information necessary for searching a route; processing means for generating pixel data of an intersection and an arrow indicating a direction for the vehicle to turn in the intersection based upon the inputted information and the data stored in the storage media; a first memory for storing the pixel data from the processing means; and means for transmitting pixel data from the first memory; and
   a display unit including means for receiving the transmitted pixel data from the first memory; a second memory for storing the received pixel data; a display device for displaying an image including the intersection and the arrow; and driving means for operating the display device based on the pixel data in the second memory.

7. A vehicle navigation system according to claim 6 wherein said transmitting means transmits only pixel data which is changed in the first memory.

8. A vehicle navigation system comprising:
   storage means for storing data for route guidance, inclusive of map data, road data, and font data;
   input means for inputting a destination and information necessary for searching a route;
   information control means for generating pixel data for route guidance information on the basis of the inputted information and the data stored in said storage means, and for transmitting the pixel data; and
   display means for displaying the route guidance information, and
   wherein said information control means transmits only pixel data for a portion of the displayed image, less than the whole displayed image, to be changed.

9. The vehicle navigation system according to claim 8 further comprising a transmission line for transmitting the pixel data from said information control means to said display means, said transmission line being a serial transmission line for transmitting binary serial data or a parallel transmission line for transmitting binary parallel data.

* * * * *